United States Patent
Dlubak

(10) Patent No.: US 6,237,306 B1
(45) Date of Patent: *May 29, 2001

(54) PENETRATION RESISTANT WINDOW

(76) Inventor: Francis Charles Dlubak, 152 Baker La., Freeport, PA (US) 16229

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/298,791

(22) Filed: Apr. 23, 1999

Related U.S. Application Data

(63) Continuation-in-part of application No. 08/808,143, filed on Feb. 28, 1997, now Pat. No. 5,960,606.

(51) Int. Cl.[7] .................................................. E06B 3/30
(52) U.S. Cl. ...................... 52/786.11; 52/171.3; 52/208; 52/204.53; 52/204.593; 52/800.14; 428/34; 428/426; 156/106
(58) Field of Search ......................... 52/786.1, 786.11, 52/786.12, 208, 204.593, 204.595, 204.53, 171.1, 171.3, 800.12, 800.14; 428/34, 426; 156/106

(56) References Cited

U.S. PATENT DOCUMENTS

| | | |
|---|---|---|
| 2,356,878 | 8/1944 | Painter . |
| 2,392,129 | 1/1946 | Downes . |
| 2,401,552 | 6/1946 | Cox . |
| 2,406,939 | 9/1946 | Boicey . |
| 2,408,483 | 10/1946 | Rodman . |
| 2,409,808 | 10/1946 | Sowle . |
| 2,537,804 | 1/1951 | Watkins . |
| 3,023,864 | 3/1962 | Mostoller . |
| 3,061,490 | 10/1962 | Ryan . |
| 3,081,205 | 3/1963 | Shorr . |
| 3,781,184 | 12/1973 | Domicone et al. . |
| 3,881,043 | 4/1975 | Rieser et al. . |
| 4,020,217 | 4/1977 | Karasudani et al. . |
| 4,073,986 | 2/1978 | Keslar et al. . |
| 4,364,786 | 12/1982 | Smith, Jr. et al. . |
| 4,463,053 | 7/1984 | Brinegar . |
| 4,546,986 | 10/1985 | Roselli . |

(List continued on next page.)

OTHER PUBLICATIONS

"Glazing Solutions for Hurricane Protection. Windows: The First Line of Defense", Dupont (brochure).

"Granto, Different Approaches, Different Solutions. Manufacturers Offer a Variety of Very Different Products Designed to Meet the Codes", *U.S Glass, Metal and Glazing Magazine*, Mar. 1995).

"Wind, Rain and Wreckage", *DuPont Magazine*, pp. 19–21 (Jul./Aug. 1995).

*Primary Examiner*—Carl D. Friedman
*Assistant Examiner*—Winnie Yip
(74) *Attorney, Agent, or Firm*—Alan G. Towner; Eckert Seamans Cherin & Mellott, LLC

(57) ABSTRACT

A penetration resistant window includes a sheet of window glass having a penetration resistant layer of ionoplast material adhered thereto. A floating sheet made of hard material such as glass is adhered to the penetration resistant layer in order to provide abrasion resistance. The perimeter of the floating sheet is set back from the perimeter of the window glass. This set back allows the window to be mounted in a window or door frame such that the perimeters of the window glass and penetration resistant sheet are secured to the frame, but the floating sheet is unconstrained by the frame. The penetration resistant window is useful in architectural, residential and institutional applications for resisting debris penetration during hurricanes.

12 Claims, 4 Drawing Sheets

U.S. PATENT DOCUMENTS

| | | | |
|---|---|---|---|
| 4,594,290 | * 6/1986 | Fischer et al. | 428/212 |
| 4,642,255 | 2/1987 | Dlubak . | |
| 4,960,631 | 10/1990 | Walters et al. . | |
| 5,002,820 | 3/1991 | Bolton et al. . | |
| 5,426,897 | 6/1995 | Gazaway . | |
| 5,519,979 | 5/1996 | Kunert et al. . | |
| 5,553,422 | 9/1996 | Gazaway . | |
| 5,593,786 | 1/1997 | Parker et al. . | |
| 5,778,629 | 7/1998 | Howes . | |
| 5,937,611 | 8/1999 | Howes . | |
| 6,101,783 | 8/2000 | Howes . | |

* cited by examiner

PENETRATION RESISTANT WINDOW

CROSS REFERENCE TO RELATED APPLICATION

This application is a continuation-in-part of U.S. application Ser. No. 08/808,143 filed Feb. 28, 1997, now U.S. Pat. No. 5,960,606, which is incorporated herein by reference.

FIELD OF THE INVENTION

The present invention relates to penetration resistant windows, and more particularly relates to laminated window glass which resists damage from hurricanes and the like.

BACKGROUND INFORMATION

Hurricane damage to residential and commercial buildings is a major problem, particularly in coastal regions. For example, Hurricane Andrew which hit Florida in 1992 caused tens of billions of dollars in property damage. A large amount of hurricane damage to buildings is caused by penetration of the building envelope, allowing forceful winds and weather to penetrate or enter the interior of the building. In a typical hurricane scenario, high winds initially throw debris through a building window. The wind then enters through the broken window, increasing internal air pressure within the building. The increased internal pressure places extremely high stresses on the walls and roof, typically causing the remainder of the windows to blow out and, in some cases, the roof to blow off. Hurricanes also exhibit a push-pull effect which creates an alternating pressure differential inside and outside the building.

Recognizing the importance of maintaining window integrity, stringent codes and regulations have recently been enacted in an attempt to reduce hurricane damage. For example, certain regions of Florida have enacted codes which require windows to pass a flying missile and wind load test before an occupancy certificate will be granted. During the test, windows are impacted by a 9 pound 2 by 4 board travelling at 34 mph. After impact, the windows are subjected to alternating push-pull forces comprising 9,000 inward and outward pressure cycles every 1 to 3 seconds, thereby simulating the alternating forces experienced in a hurricane. The windows must withstand penetration during this test in order to meet the code.

One solution to hurricane-induced window damage is to fit metal storm shutters over the windows. While this approach meets the above-noted code, the shutters must be installed prior to a hurricane. If a building is unattended, or if a storm is not anticipated, the metal shutters may not be installed in time to adequately prevent damage. Furthermore, shuttering of unattended buildings sends a signal to potential burglars and vandals that a building is unoccupied.

Another approach for preventing hurricane damage which meets the above-noted code is the use of window glass laminated with several co-extensive polymeric layers. The polymeric layers include a polyvinyl butyral (PVB) layer attached to the window glass, a polyester middle layer, and an abrasion resistant coating. The composite layers are sold by Dupont under the designation SentryGlas. While window glass laminated with such composite layers meets the above-noted code, the exposed inner surface of the window is relatively susceptible to cuts, abrasions and scratches. Attempts have been made to replace the coextensive abrasion resistant coating with an inner layer of glass in order to improve abrasion resistance. However, windows incorporating such glass inner layers have not adequately prevented penetration, and have not been able to meet the above-noted code.

The present invention has been developed in view of the foregoing, and to overcome other deficiencies of the prior art.

SUMMARY OF THE INVENTION

The present invention provides a penetration resistant window including a frame, window glass constrained within the frame, a penetration resistant sheet substantially co-extensive with the window glass constrained within the frame, and a floating sheet supported on the penetration resistant sheet and substantially unconstrained by the frame.

The present invention also provides a sheet of laminated window glass including a layer of window glass, a penetration resistant sheet adhered to the layer of window glass and substantially co-extensive therewith, and a floating sheet adhered to the penetration resistant sheet having a perimeter that is set back from the perimeter of the window glass layer.

The present invention will more readily understood from the following description.

DETAILED DESCRIPTION OF THE PREFERRED EMBODIMENTS

Figure 1:
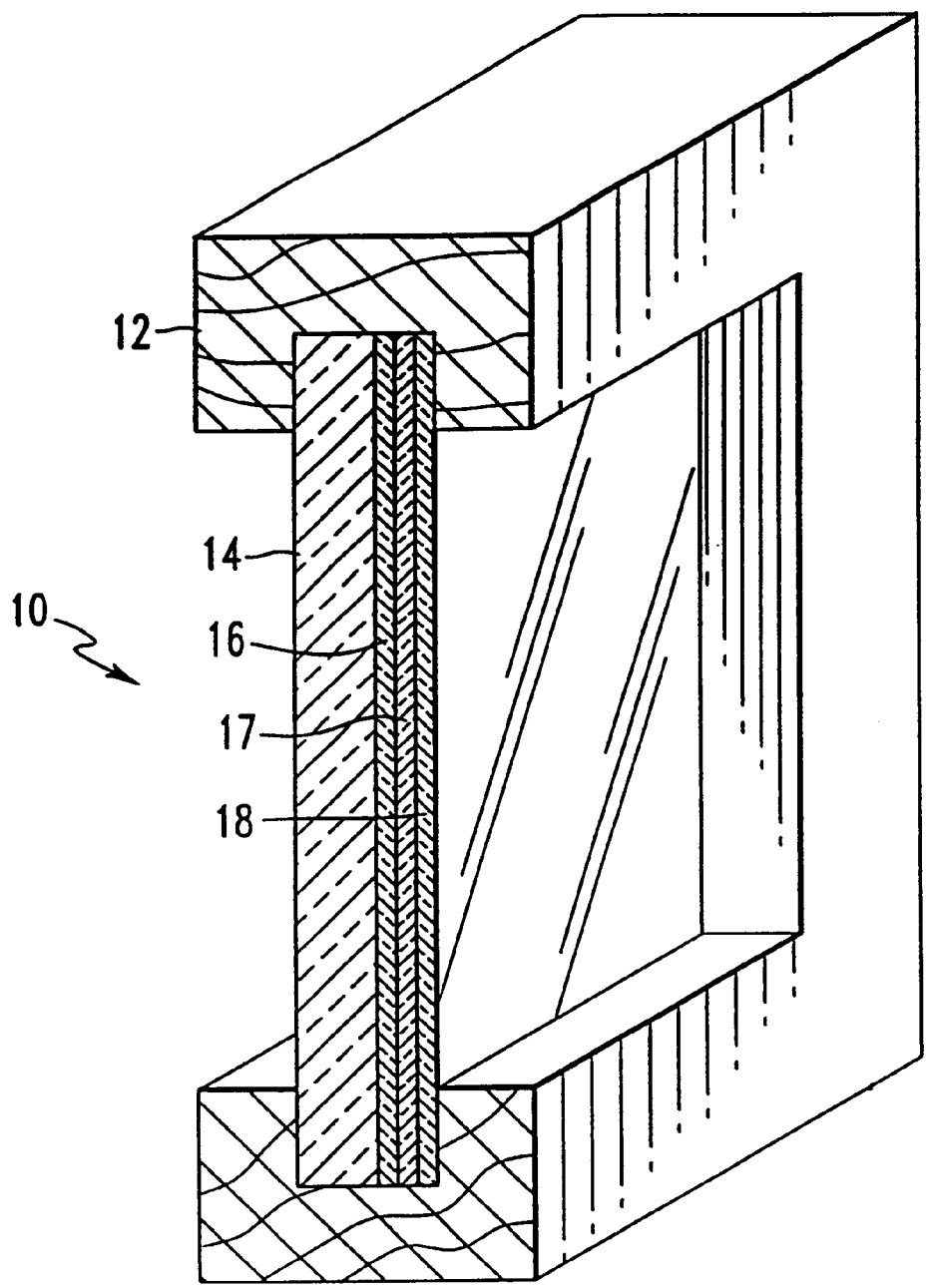
FIG. 1 is a partially schematic sectional perspective view showing a conventional penetration resistant window.

FIG. 1 schematically illustrates a conventional penetration resistant window 10 including a window frame 12. A sheet of window glass 14 is secured about its perimeter by the frame 12. Multiple polymeric layers are laminated on the window glass 14 such that the layers are co-extensive with the window glass and secured about their perimeters by the frame 12. The polymeric layers include a polyvinyl butyral (PVB) layer 16, a polyester (PET) layer 17 and an abrasion resistant coating layer 18. The layers 16, 17 and 18 form a composite laminated sheet commercially available from Dupont under the designation SentryGlas.

The conventional penetration resistant window shown in FIG. 1 is capable of meeting stringent code requirements. In particular, such windows pass the Florida flying missile and wind load test which involves projecting a 9 pound 2 by 4 board at the window at 34 mph, followed by 9,000 inward and outward pressure cycles. While prior art windows as shown in FIG. 1 exhibit extremely good penetration resistance, the inner surfaces of such windows are susceptible to abrasion, scratching and cutting. Although an abrasion resistant coating 18 is provided on the interior side of the windows, the coating does not adequately protect against many types of abrasions, cuts and scratches.

Figure 2:
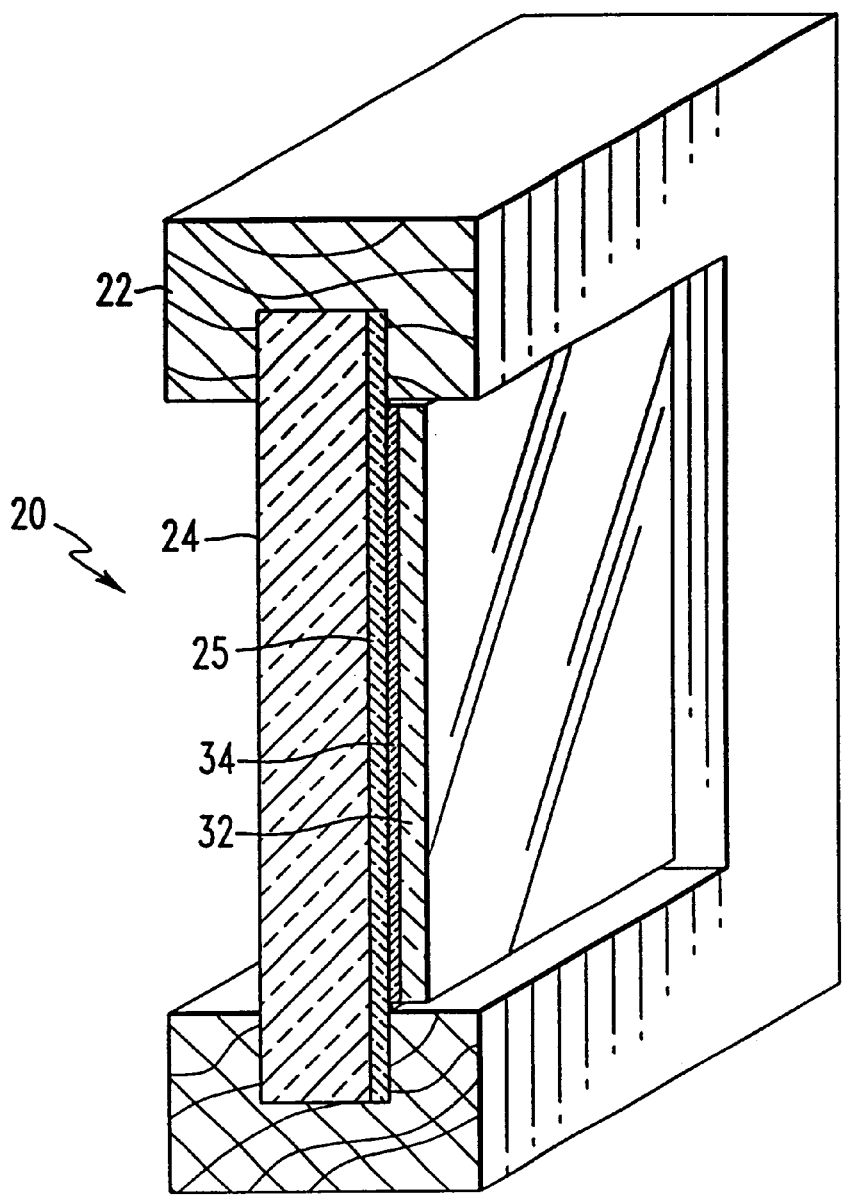
FIG. 2 is a partially schematic sectional perspective view showing a penetration resistant window in accordance with an embodiment of the present invention.

FIG. 2 schematically illustrates a penetration resistant window 20 in accordance with an embodiment of the present invention. The window 20 may be used in architectural, residential and institutional applications. A window frame 22 secures a sheet of window glass 24 about its perimeter. A penetration resistant sheet 25 is laminated on the window glass 24 such that the penetration resistant sheet is substantially co-extensive with the window glass. Both the window glass 24 and penetration resistant sheet 25 are secured about their perimeters within a channel of the window frame 22. The glass 24 and penetration resistant sheet 25 are secured within the frame 22 by any suitable means such as adhesives, mechanical pressure, fasteners or the like. In a preferred embodiment, silicone glue is used to secure the glass 24 and penetration resistant sheet 25 within the frame 22.

The window glass 24 may be of any suitable thickness, typically from about 1/16 to about 1 inch. The window glass 24 may be made of any suitable material including glasses such as annealed, heat strengthened or tempered glass. A particularly preferred window glass 24 comprises annealed glass having a thickness of from about 1/8 to about 3/8 inch. While the use of glass is preferred, the window glass 24 may alternatively comprise other materials such as polycarbonate or other types of polymers in accordance with the present invention. The window glass 24 preferably comprises a single layer, but may alternatively include multiple layers.

The penetration resistant sheet 25 is preferably made of an ionoplast polymeric material having satisfactory penetration resistance and light transmission characteristics. The ionoplast penetration resistant sheet 25 may comprise ethylene/methacrylic acid copolymers, and may have a thickness of from about 1 to about 200 mils. A suitable ionoplast penetration resistant sheet is sold by Dupont under the designation SentryGlas Plus. Single or multiple layers of the ionoplast material may be used to form the penetration resistant sheet 25. Alternatively, the penetration resistant sheet may comprise PVB laminates commercially available from Solutia and DuPont, or PET laminates available from 3M.

As shown in FIG. 2, a floating sheet 32 is supported on the penetration resistant sheet 25 but is not co-extensive therewith. Instead of extending into the frame 22 with the penetration resistant sheet 25 and window glass 24, the floating sheet 32 has a perimeter which is set back from at least a portion of the perimeter of the window glass and penetration resistant sheet. The floating sheet 32 is thus substantially unconstrained by the frame 22. The surface of the floating sheet 32 preferably extends across substantially the entire sight line of the window 20. The gap between the edge of the floating sheet 32 and the frame 22 may optionally be filled with caulking or the like.

The floating sheet 32 may be of any suitable thickness, typically from about 1/32 to about 1/2 inch. The floating sheet 32 may be made from any suitable material having sufficient abrasion resistance. The floating sheet 32 is preferably made of glass such as annealed, heat strengthened or tempered glass. However, other materials such as hard polymers may be used. The floating sheet 32 may also include multiple layers. For example, the floating sheet 32 may comprise multiple layers of plastic that can be individually removed from the window as desired. In many applications, the floating sheet 32 is substantially clear. Alternatively, colored, etched, roller coated, spray painted or silk screened floating sheets may be used. In a preferred embodiment, the floating sheet 32 comprises annealed glass having a thickness of from about 1/16 to about 3/8 inch. Additional thermal insulation layers may be mounted adjacent the floating sheet 32 or adjacent the window glass 24.

In the embodiment shown in FIG. 2, an adhesive layer 34 is used to mount the floating sheet 32 on the penetration resistant sheet 25. The adhesive layer 34 is preferably substantially co-extensive with the floating sheet. Any suitable type of adhesive layer 34 may be used, provided that it adequately secures the floating sheet 32 to the penetration resistant sheet 25 and does not decrease light transmission through the window 20 to an undesirable extent. The adhesive layer may comprise polyurethane, PVB or silicone, with polyurethane being preferred in many applications.

Figure 3:
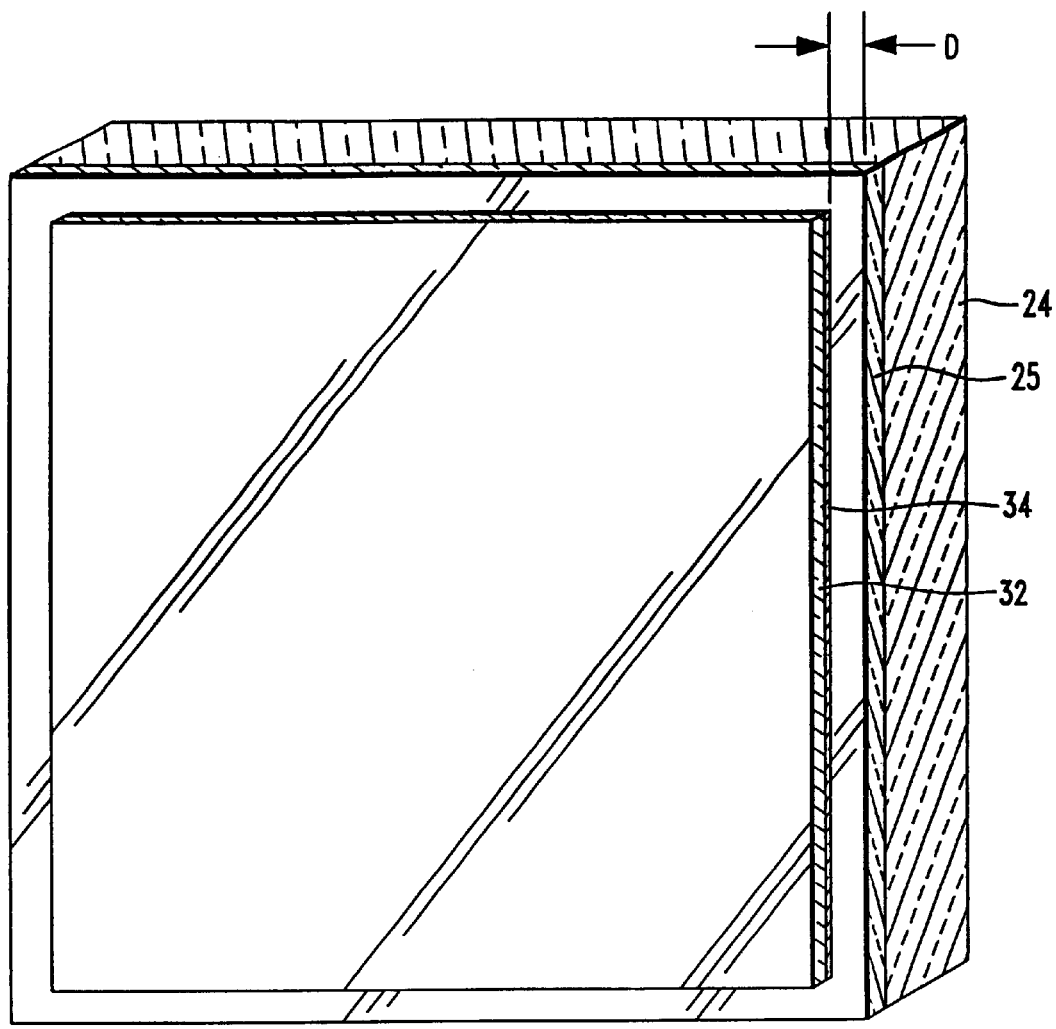
FIG. 3 is a partially schematic front view of penetration resistant window glass in accordance with an embodiment of the present invention.

FIG. 3 is a front perspective view showing a sheet of laminated window glass in accordance with a preferred embodiment of the present invention. The window glass 24 and penetration resistant sheet 25 are substantially co-extensive. The floating sheet 32 is set back a distance D from the window glass 24 and penetration resistant sheet 25. The set back distance D may be adjusted depending on the depth of the window frame into which the laminated window glass is to be installed. The set back distance D typically ranges from about 1/16 to about 2 inch, preferably from about 1/4 to about 1 inch. For many window frames, a set back distance of about 1/2 inch is preferred. The floating sheet 32 is preferably set back from the window glass 24 and penetration resistant sheet 25 around its entire perimeter. The set back may also act to align the window glass 24 in the desired location during installation in the frame 22. The set back distance D may be substantially uniform around the perimeter of the floating sheet 32, or may be varied. The set back distance D is preferably selected such that the floating sheet 32 substantially covers the window sight line when the laminated window glass is mounted in the window frame.

Figure 4:
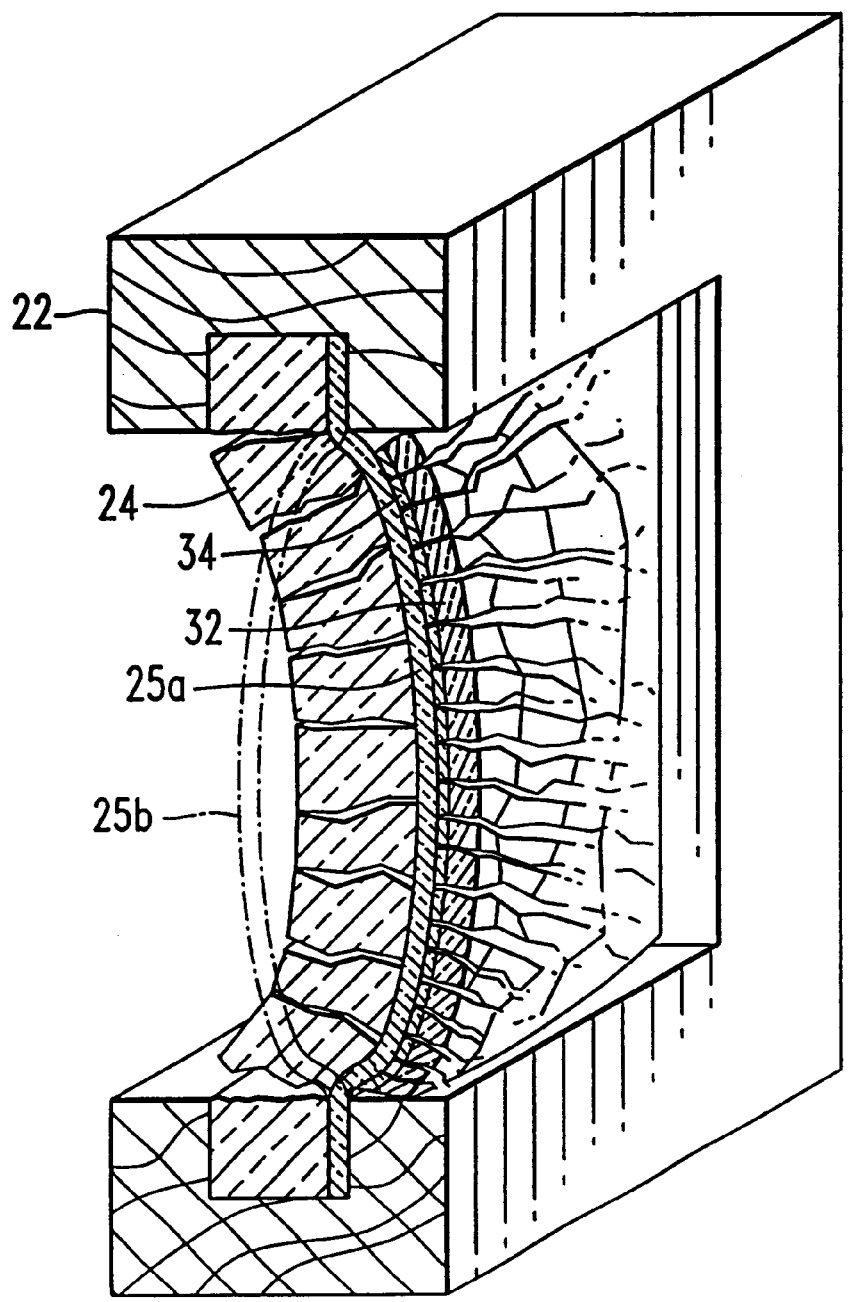
FIG. 4 is a partially schematic sectional perspective view illustrating the penetration resistance of a window in accordance with an embodiment of the present invention during the application of alternating inward and outward pressure.

FIG. 4 schematically illustrates a window of the present invention similar to that shown in FIG. 2 subjected to alternating inward and outward pressure typical of the pressures encountered during a hurricane. In a typical hurricane scenario, flying debris would impact the window glass 24 causing it to break into many pieces as shown in FIG. 4. The penetration resistant sheet remains intact upon impact by the flying debris. The impact of the flying debris may also fracture the floating sheet 32. However, the adhesive layer 34 secures many of the broken pieces of the floating sheet 32 to the penetration resistant sheet 25a. In this manner, upon impact by the debris, flying pieces of the floating sheet 32 are reduced or eliminated. After impact, inwardly applied pressure causes the penetration resistant sheet 25a to deform inwardly as shown in FIG. 4. A reversal from inward to outward pressure causes the penetration resistant sheet to deform outwardly as shown in phantom at 25b. For purposes of clarity, the outwardly deformed penetration resistant sheet 25b is shown without the layer of window glass 24, floating sheet 32 and adhesive layer 34 attached thereto. After repeated cycling between inward and outward pressure, the penetration resistant sheet 25a, 25b remains substantially intact. The window of the present invention is thus resistant to penetration when subjected to forces similar to those experienced during a hurricane.

The laminated window glass of the present invention may preferably be fabricated in the following manner. A first sheet of window glass 24 is cleaned and a penetration resistant sheet 25 is laid thereon. A smaller sheet of adhesive material 34 is placed on the penetration resistant sheet 25 such that a set back is formed. A floating sheet 32 is then laid on the adhesive sheet 34 with a set back from the perimeter of the window glass 24. Heat and pressure are applied to at least partially liquify the penetration resistant sheet 25 and the adhesive sheet 34. The resultant product comprises a laminated composite.

The following example is intended to illustrate various aspects of the present invention, and is not intended to limit the scope thereof.

EXAMPLE

A sheet of laminated window glass is formed as follows. A sheet of annealed window glass having a thickness of ¼ inch, a height of 48 inches and a width of 48 inches is cleaned and laid flat. Next, a sheet of Dupont SentryGlas Plus penetration resistant ionoplast material is cut to the same size as the first sheet of window glass. The penetration resistant laminate sheet is placed against the glass sheet. Next, a sheet of polyurethane having a thickness of 25 mils is step cut to 47 by 47 inches to the size of the sight line of a window frame opening and placed on top of the penetration resistant sheet. A sheet of annealed glass having a thickness of ⅛ inch is then step cut to a 47 by 47 inch window sight line and centered on the other layers. This lay up is then placed in a film type bag and the air is vacuumed out. The bag containing the lamination composition is then placed into a vessel and pressurized at about 150 psi at a temperature of about 280° F. for 2.5 hours. After this process is completed, the laminated composite window glass is removed. The resultant laminated composite window is mounted n a frame as shown in FIG. 2.

While particular embodiments of the present invention have been described herein, it is to be understood that various changes, additions, modifications and adaptations may be made without departing from the scope of the invention, as set forth in the following claims.

What is claimed is:

1. A penetration resistant architectural window comprising:
   a frame;
   window glass constrained within the frame;
   a penetration resistant sheet comprising an ionoplast material substantially co-extensive with the window glass and constrained within the frame, wherein the window glass and the penetration resistant sheet have substantially the same periphery; and
   a floating sheet supported on the penetration resistant sheet and substantially unconstrained by the frame, wherein the penetration resistant sheet remains substantially intact after the window glass is broken and the window is subjected to a repeated cycling of inward and outward pressures applied against the penetration resistant sheet.

2. The penetration resistant architectural window of claim 1, wherein the penetration resistant sheet comprises a single layer of the ionoplast material.

3. The penetration resistant architectural window of claim 1, wherein the ionoplast material of the penetration resistant sheet comprises ethylene/methacrylic acid copolymers.

4. The penetration resistant architectural window of claim 1, wherein the penetration resistant sheet comprises a layer of the ionoplast material adhered to the window glass and a polyester layer adhered to the ionoplast material layer.

5. The penetration resistant architectural window of claim 1, wherein the penetration resistant sheet is adhered directly to the frame.

6. The penetration resistant architectural window of claim 1, wherein the floating sheet has a perimeter that is set back from a perimeter of the window glass a distance of from about ¼ to about 1 inch.

7. The penetration resistant architectural window of claim 6, wherein the set back is substantially uniform around the perimeter of the floating sheet.

8. The penetration resistant architectural window of claim 6, wherein the floating sheet substantially covers a sight line of the window.

9. The penetration resistant architectural window of claim 1, wherein the window glass comprises a single layer of annealed glass having a thickness of from about ⅛ to about ⅜ inch.

10. The penetration resistant architectural window of claim 1, wherein the floating sheet comprises glass.

11. The penetration resistant architectural window of claim 10, wherein the floating sheet has a thickness of from about 1/32 to about ½ inch.

12. The penetration resistant architectural window of claim 1, wherein the floating sheet comprises annealed glass having a thickness of from about 1/16 to about ⅜ inch.

\* \* \* \* \*